Aug. 21, 1962     J. THEVENAZ     3,050,227
DEVICE FOR THE SOUND REPRODUCTION OF CINEMATOGRAPHIC FILMS
Filed Dec. 27, 1960
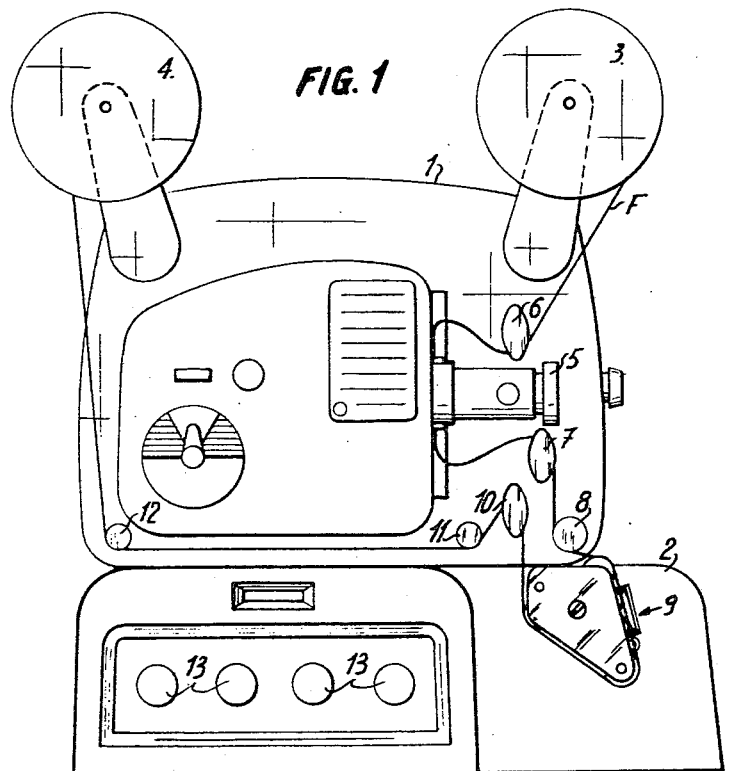
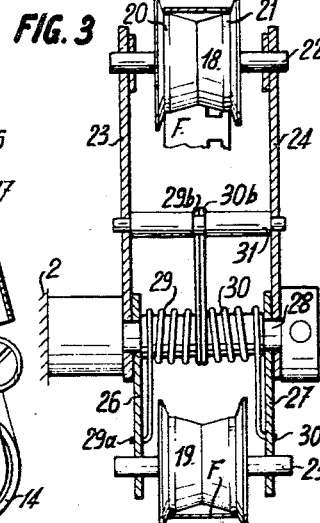
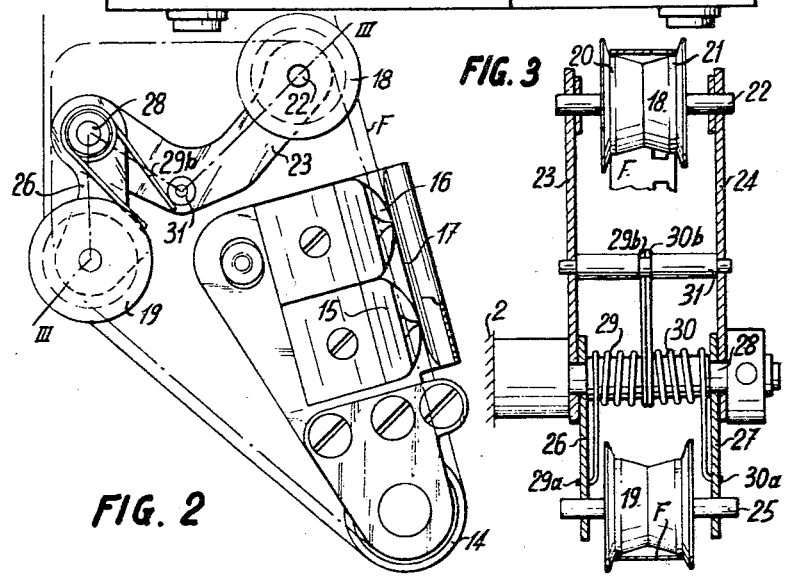
INVENTOR
JEAN THEVENAZ United States Patent Office 3,050,227
Patented Aug. 21, 1962

3,050,227
DEVICE FOR THE SOUND REPRODUCTION
OF CINEMATOGRAPHIC FILMS
Jean Thevenaz, Grandson, Vaud, Switzerland, assignor to Paillard S.A., Sainte-Croix, Switzerland, a corporation of Switzerland
Filed Dec. 27, 1960, Ser. No. 78,489
Claims priority, application Switzerland Dec. 29, 1959
3 Claims. (Cl. 226—195)

Devices for the sound reproduction of cinematographic films are already known comprising a roller solid in rotation with a flywheel for regularising the speed of advance of the film and two tensioning rollers subjected to an elastic action and disposed in such a manner that the film leaving a sprocket wheel of a cinematographic projector passes over a tensioning roller, then over a regulating roller and finally over the other tensioning roller, each tensioning roller having two circular bearings each adapted to support an edge of the film. In these devices, the spindles of the tensioning rollers always have a well defined orientation. As cinematographic films are practically never rigorously rectilinear, the pressures between the two edges of the film and the two bearings of a tensioning roller are often different and it may occur that the film is only applied by one of its edges against a single bearing of a roller. Under these conditions, the film is not applied correctly over the magnetic heads, there is a "separation" and the sound reproduction is considerably affected; on the other hand the speed of the film may become irregular in front of the reading devices, which may be magnetic or optical.

For remedying this disadvantage, it has already been proposed to utilise a tensioning roller turning on a spherical portion of a stationary spindle, in such a manner as to be capable of being directed freely. However, the machining of spherical projections should be very precise and increases the cost of manufacture substantially.

The invention has for its object to remedy completely and in a very simple manner the above inconveniences, by reason of the fact that each tensioning roller is traversed by a spindle of which the two ends are carried with clearance by two arms mounted pivotally about a same geometrical axis, said two arms being capable of pivoting independently of one another and each subjected to the said elastic action.

One form of construction of the device, object of the invention, is shown diagrammatically and by way of example with reference to the accompanying drawings, wherein:

FIG. 1 is a side view of a projector equipped with a device for the reproduction of sound.

FIG. 2 is a view to a larger scale of the reading device, the protecting cover being removed.

FIG. 3 is a developed section on the line III—III of FIG. 2.

FIG. 1 shows a projector 1 mounted on a base 2 carrying the elements necessary for sound reproduction. The projector comprises, in the classical manner, a feed spool 3 and a receiving spool 4, a luminous source, and objective 5, and mechanism not shown in detail, for driving the film F. The film supplied by the spool 3 passes over a feeder 6, behind the objective 5, over a feeder 7, over a roller 8, around a reading device 9, which is shown in detail in FIGS. 2 and 3, over a feeder 10 and over rollers 11 and 12, before being wound on the spool 4.

The reading device 9 is fixed on a base 2 which contains an amplifier of which the adjusting knobs 13 are visible in FIG. 1.

The reading device comprises a roller 14 covered with rubber and secured in rotation with a flywheel, not shown, for regulating the speed of advance of the film. This device also comprises a magnetic reading head 15 and an effacing head 16 in front of which passes the film F of which the sound track is pressed against these heads by a shoe 17. This device also comprises two tensioning rollers 18 and 19 subjected to an elastic action. The film F which leaves the roller 8 of the projector, passes over a tensioning roller 18, then over a regulating roller 14, and finally over the tensioning roller 19, before reaching the feeder 10 of the projector. Each roller has two circular projections 20 and 21 each adapted to support an edge of the film F. The roller 18 is traversed by a spindle 22 on which it can turn freely and of which the two ends are carried with clearance by two arms 23 and 24. Similarly the roller 19 is carried by a spindle 25 carried with clearance by two arms 26 and 27. The arms 23, 24, 26 and 27 are pivotally mounted on a trunnion 28 which is secured to the base 2. This trunnion is surrounded by two helical springs 29 and 30. One end 29a, 30a, respectively, of each spring, bears on each of the arms 26 and 27. The other end 29b, 30b, respectively, bears against the middle of the cross-bar 31 which is secured with clearance between the two arms 23 and 24 carrying the roller 18.

By reason of the clearance provided, on the one hand, between the cross-bar 31, the spindle 22 and the arms 23 and 24 and, on the other hand, between the spindle 25 and the arms 26 and 27, the two arms carrying the tensioning rollers may turn independently of one another, to a predetermined extent, so that the axis of rotation of this roller may be directed freely so as to obtain equilibrium of the pressures exerted by the two projections 20 and 21 on the two opposite edges of the film F. It will be understood that the springs 29 and 30 are similar in such a manner that the arms 26 and 27 are each subjected to an elastic action of the same value. By reason of the symmetry of mounting, it will be seen that the resultant of the elastic action applied to each tensioning roller is substantially perpendicular to the spindle of this roller and passes mid-way between the two circular projections 20 and 21. When the film has an irregularity which is translated by a difference in length between these two parallel edges, the spindle of the rollers 18 and 19 is directed in such a manner as to compensate this irregularity which is always of low value.

It will be understood that it is possible to provide numerous modifications in the device described and it is possible to provide the device with two trunnions, each thereof being adapted to carry the pair of arms of the tensioning roller.

I claim:

1. A device for guiding a looped portion of a cinematographic file in its movement relative to a sound head from a feed spool to a receiving spool, comprising, in combination, a film speed regulating roller located between the feed and receiving spool and over which the film passes, two pairs of spaced arms, a common support pivotally connecting the related inner ends of said arms, spring means coiled about said support and having radial ends engaging said pairs of spaced arms independently to urge their outer ends respectively in opposite directions, and film engaging rollers between each pair of arms, said rollers mounted on said spindles journalled freely to rotate and slide axially in the outer ends of said arms and also to tilt axially therein, said rollers pressing the film loop outwardly between said speed regulating roller and the feed and receiving spools respectively.

2. A device according to claim 1, wherein opposite corresponding arms of each pair are spaced apart by a cross bar.

3. A device according to claim 2, wherein the spring means comprises two independent springs each having radial inner and outer ends extending in opposite directions, the inner ends having portions engaging with said cross bar and the outer radial ends having offset portions engaging opposite related arms.

References Cited in the file of this patent

UNITED STATES PATENTS

| | | |
|---|---|---|
| 1,427,602 | Kaiser | Aug. 29, 1922 |
| 2,349,018 | Tasker | May 16, 1944 |
| 2,570,773 | Davis | Oct. 9, 1951 |